United States Patent [19]

Wagner

[11] Patent Number: 5,463,543
[45] Date of Patent: Oct. 31, 1995

[54] CONTROL SYSTEM INCORPORATING A FINITE STATE MACHINE WITH AN APPLICATION SPECIFIC LOGIC TABLE AND APPLICATION INDEPENDENT CODE

[75] Inventor: Ferdinand H. Wagner, Wheaton, Ill.

[73] Assignee: Janusz A. Dobrowolski, Wheaton, Ill.; a part interest

[21] Appl. No.: 219,194

[22] Filed: Mar. 28, 1994

Related U.S. Application Data

[63] Continuation of Ser. No. 693,936, Apr. 29, 1991, Pat. No. 5,301,100.

[51] Int. Cl.$^6$ .................................................. G05B 11/01
[52] U.S. Cl. .................... 364/141; 364/148; 364/DIG. 2; 364/977.5
[58] Field of Search ..................... 364/140–142, 364/147, 148, 194, 949–949.2, 926.9–926.93, 977.5; 395/800

[56] References Cited

U.S. PATENT DOCUMENTS

| | | |
|---|---|---|
| 4,241,401 | 12/1980 | De Ward et al. . |
| 4,241,402 | 12/1980 | Mayper, Jr. et al. . |
| 4,608,628 | 8/1986 | Saito et al. ............................ 364/141 |
| 4,628,435 | 12/1986 | Tashiro et al. ......................... 364/130 |
| 4,675,556 | 6/1987 | Bazes . |
| 4,700,326 | 10/1987 | Florine .................................. 364/140 |
| 4,734,856 | 3/1988 | Davis . |
| 4,747,127 | 5/1988 | Hansen et al. . |
| 4,796,179 | 1/1989 | Lehman et al. . |
| 4,802,162 | 1/1989 | Kakuda et al. . |
| 4,803,636 | 2/1989 | Nishiyama et al. . |
| 4,805,099 | 2/1989 | Huber . |
| 4,819,161 | 4/1989 | Konno et al. . |
| 4,829,575 | 5/1989 | Lloyd . |
| 4,843,545 | 6/1989 | Kikuchi . |
| 4,845,627 | 7/1989 | Nadolski et al. ...................... 364/147 |
| 4,858,102 | 8/1989 | Lovrenich ............................. 364/136 |
| 5,125,098 | 6/1992 | Burrows ................................ 395/800 |

OTHER PUBLICATIONS

Koban, "Switching and Finite Automata Theory," McGraw-Hill, 1978 pp. 246–247.
Jacob Millman, PhD. and Christos Halkias, PhD., "Integrated Electronics: Analog and Digital Circuits and Systems," McGraw-Hill, 1972 pp. 614–617.
Alan M. Davis, "A Comparison of Techniques for the Specification and External System Behavior," Computing Practices, Sep. 1988, vol. 31, No. 9.
Hatley, D. J., Pibhai I. A., "Strategies for Real–Time System Specification," Dorset House Publishing, New York, 1988 pp. 74–75.
Clare, C. R., "Designing Logic System Using State Machine," McGraw–Hill, 1973 p. 20.

Primary Examiner—Roy N. Envall, Jr.
Assistant Examiner—Steven R. Garland
Attorney, Agent, or Firm—Dressler, Goldsmith, Shore & Milnamow, Ltd.

[57] ABSTRACT

A control system includes preprocessing circuitry which converts sensed input signals to a plurality of names. A processing unit which is controlled by a fixed, prestored, program combines the input names with prestored control words from an application logic table to produce output names which are indicative of a control action for the purpose of controlling the process. Postprocessing circuitry converts the output names to signals for controlling the process.

25 Claims, 11 Drawing Sheets

FIG. 7

| INPUT SIGNAL | INPUT NAME |
|---|---|
| TIMER | |
|     TIMER ELAPSED | TIMEOUT |
| 701 ↘ BOOLEAN | |
|     DOOR_CLOSED = FALSE | DOOR_CLOSED |
|     DOOR_CLOSED = TRUE | DOOR_OPEN |
|     WATER_LOW = FALSE | WAT_HIGH |
|     WATER_LOW = TRUE | WAT_LOW |
| 702 ↘ DIGITS | |
|     DIGIT = 0 | NULL |
|     DIGIT = 1...9 | ANY ⟵ 703 |
| 704 ↘ COUNTER | |
|     COUNT = 1 | FIRST |
|     COUNT = 2...MAX-1 | - (NOT USED) ⟵ 705 |
|     COUNT = MAX | LAST |
| 706 ↘ DISCRIMINATOR SIGNAL | ⟵ 707 |
|     DISCR = 0 (HIGH) | TEMP_HIGH, TEMP_OUT |
|     DISCR = 1 (IN) | TEMP_IN |
|     DISCR = 2 (LOW) | TEMP_LOW, TEMP_OUT |
| COMMAND | ⟵ 708 |
|     CMD = 1 | CMD_OFF |
|     CMD = 5 | CMD_ON |
|     CMD = 6 | CMD_IDLE |
| 709 ↘ PARAMETER | |
|     WATER_CONTROL = FALSE | WAT_DIS |
|     WATER_CONTROL = FALSE | WAT_ENA |

FIG. 8A

| STATE | NEXT STATE | CONDITION | ACTION |
|---|---|---|---|
| STATE_ON — 801 | STATE_OFF — 802 | CMD_OFF — 803 | ENTRY ACTION<br>MOTOR_ON<br>START_TIMER — 806 |
| | STATE_IDLE — 804 | DOOR_CLOSED AND MOTOR_OK OR<br>TEMP_HIGH AND WAT_LOW AND WAT_ENA OR — 805<br>TIMEOUT | EXIT ACTION<br>STOP_TIMER — 809 |
| | STATE_ERROR — 808 | DOOR_OPEN AND TEMP_HIGH OR<br>DOOR_OPEN AND WAT_LOW AND WAT_ENA — 807 | INPUT ACTION<br>ALARM_MOTOR_NOT_OK — 811 |
| | | TIMEOUT OR<br>WAT_LOW AND WAT_ENA — 810 | INPUT ACTION<br>ALARM_TEMP_HIGH — 813 |
| | | TEMP_HIGH AND DOOR_OPEN — 812 | INPUT ACTION<br>ALARM_DOOR_OPEN — 815<br>MOTOR_OFF |
| | | DOOR_OPEN AND MOTOR_OK — 814 | |

FIG. 9A

|  | A | B | Y |
|---|---|---|---|
|  | <3 |  | 0 |
| 903 | 3-8 | <=5 | 1 |
|  | 3-8 | >5 | 0 |
|  | 9-17 | <=5 | 1 |
|  | 9-17 | >5 | 2 |
|  | >17 |  | 0 |

901

904

ROM 902

| A \ B | 0 | 1 | 2 | 3 | 4 | 5 | 6 | 7 | 8 | 9 | 10 |
|---|---|---|---|---|---|---|---|---|---|---|---|
| 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 |
| 3 | 1 | 1 | 1 | 1 | 1 | 1 | 0 | 0 | 0 | 0 | 0 |
| 4 | 1 | 1 | 1 | 1 | 1 | 1 | 0 | 0 | 0 | 0 | 0 |
| 5 | 1 | 1 | 1 | 1 | 1 | 1 | 0 | 0 | 0 | 0 | 0 |
| 6 | 1 | 1 | 1 | 1 | 1 | 1 | 0 | 0 | 0 | 0 | 0 |
| 7 | 1 | 1 | 1 | 1 | 1 | 1 | 0 | 0 | 0 | 0 | 0 |
| 8 | 1 | 1 | 1 | 1 | 1 | 1 | 0 | 0 | 0 | 0 | 0 |
| 9 | 1 | 1 | 1 | 1 | 1 | 1 | 2 | 2 | 2 | 2 | 2 |
| 10 | 1 | 1 | 1 | 1 | 1 | 1 | 2 | 2 | 2 | 2 | 2 |
| 11 | 1 | 1 | 1 | 1 | 1 | 1 | 2 | 2 | 2 | 2 | 2 |
| 12 | 1 | 1 | 1 | 1 | 1 | 1 | 2 | 2 | 2 | 2 | 2 |
| 13 | 1 | 1 | 1 | 1 | 1 | 1 | 2 | 2 | 2 | 2 | 2 |
| 14 | 1 | 1 | 1 | 1 | 1 | 1 | 2 | 2 | 2 | 2 | 2 |
| 15 | 1 | 1 | 1 | 1 | 1 | 1 | 2 | 2 | 2 | 2 | 2 |
| 16 | 1 | 1 | 1 | 1 | 1 | 1 | 2 | 2 | 2 | 2 | 2 |
| 17 | 1 | 1 | 1 | 1 | 1 | 1 | 2 | 2 | 2 | 2 | 2 |
| 18 | 0 | 0 | 0 | 0 | 0 | 0 | 0 | 0 | 0 | 0 | 0 |
| 19 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 |

A → 
B → 
→ Y

CONTROL SYSTEM INCORPORATING A FINITE STATE MACHINE WITH AN APPLICATION SPECIFIC LOGIC TABLE AND APPLICATION INDEPENDENT CODE

This application is a continuation of application Ser. No. 07/693,936, filed Apr. 29, 1991, now U.S. Pat. No. 5,301,100.

The present invention applies to a computer driven system where the problem of control is of significant importance. It applies especially to real time systems.

BACKGROUND OF THE INVENTION

In this specification reference is made to the following publications:

1. Davis A. M.: "A Comparison of Techniques for the Specification of External System Behavior". Communications of the ACM, September 1988, vol. 31, No. 9, pp. 1098–1115.
2. Clare C. R.: Designing Logic System Using State Machine. McGraw-Hill, 1973.
3. Kohavi Z.: Switching and Finite Automata Theory. McGraw-Hill, 1978.
4. Hatley D. J., Pirbhai I. A.: Strategies for Real-Time System Specification. Dorset House Publishing, New York, 1988.

and to:

U.S. Pat. No. 4,796,179: Multirate Real Time Control System Code Generator. Larry L. Lehman, et al.

The majority of computer control systems require programming for each application. The process of programming is error-prone and requires testing of implemented logic and the correctness of program statements which express this logic. The pure logic of the application is deeply buried in the program code. There is no known way to isolate the logic design from peculiarities of the programming language and its data representation.

An alternative to systems which are programmed are systems which are specified. The advantages of control systems which are well specified in comparison to systems which are programmed are well known and summarized e.g. in reference 1 by Davis. As taught in reference U.S. Pat. No. 4,796,179 a control system can be built using subroutines describing standard control blocks. The subroutines are then linked together into the control system. Another approach is based on table driven finite state machines which are specified. This is suitable for systems intended for applications characterized by a high number of control decisions.

As shown in reference 1 by Davis for the table approach, boolean tables grow exponentially with the number of input and states. Because of this well known growth phenomena, a table driven approach has been limited to rather simple applications. Typically, only selected subsystems of a complex system are implemented as table driven finite state machines.

Input signals come to a control system from different analog and digital sensors. The signals are often of different natures: some are digital, others are analog. The digital signals are two-valued (boolean) or multivalued (numbers). The analog signals in their original form are of no use in a digital control system. Only some specific values of an analog signal are relevant for control purposes. A table driven state machine can process digital information only. Therefore, the use of table driven systems was limited to applications where input has a standard boolean form. This view is presented in reference 2 by Clare. Prior approaches were always limited by exponential growth of memory size.

SUMMARY OF THE INVENTION

A method of and apparatus for constructing a control system and a control system created thereby which is based on a finite state machine with constant code (FSMcc). An input preprocessor module normalizes input signals as required by the FSMcc logical processing unit. An output postprocessor module changes the normalized finite state machine outputs to real signals required by the controlled process or apparatus. The input preprocessor allows for a different finite state machine required for an application to be executed by the same constant code contained in the FSMcc microcode storage. An application logic table for the FSMcc is constructed using a specific organization of data representing application logic conditions. This organization allows the entire application logic to be expressed in a table of a technically feasible size. The size of the FSMcc application logic table memory is greatly reduced. The symbolic application logic table is build in a simplified form using implied AND and OR logical operators. This symbolic application table is directly converted into the FSMcc application logic table.

BRIEF DESCRIPTION OF THE DRAWINGS

In the drawings, closely related figures have the same reference numerals but different alphabetic suffixes.

FIG. 7 is a table showing examples of names used when testing the present invention.

FIG. 8A is a table showing an example of the FSMcc transition table.

FIG. 9A shows an example of a table stored in a ROM memory.

GENERAL DESCRIPTION OF THE INVENTION

Figure 1:
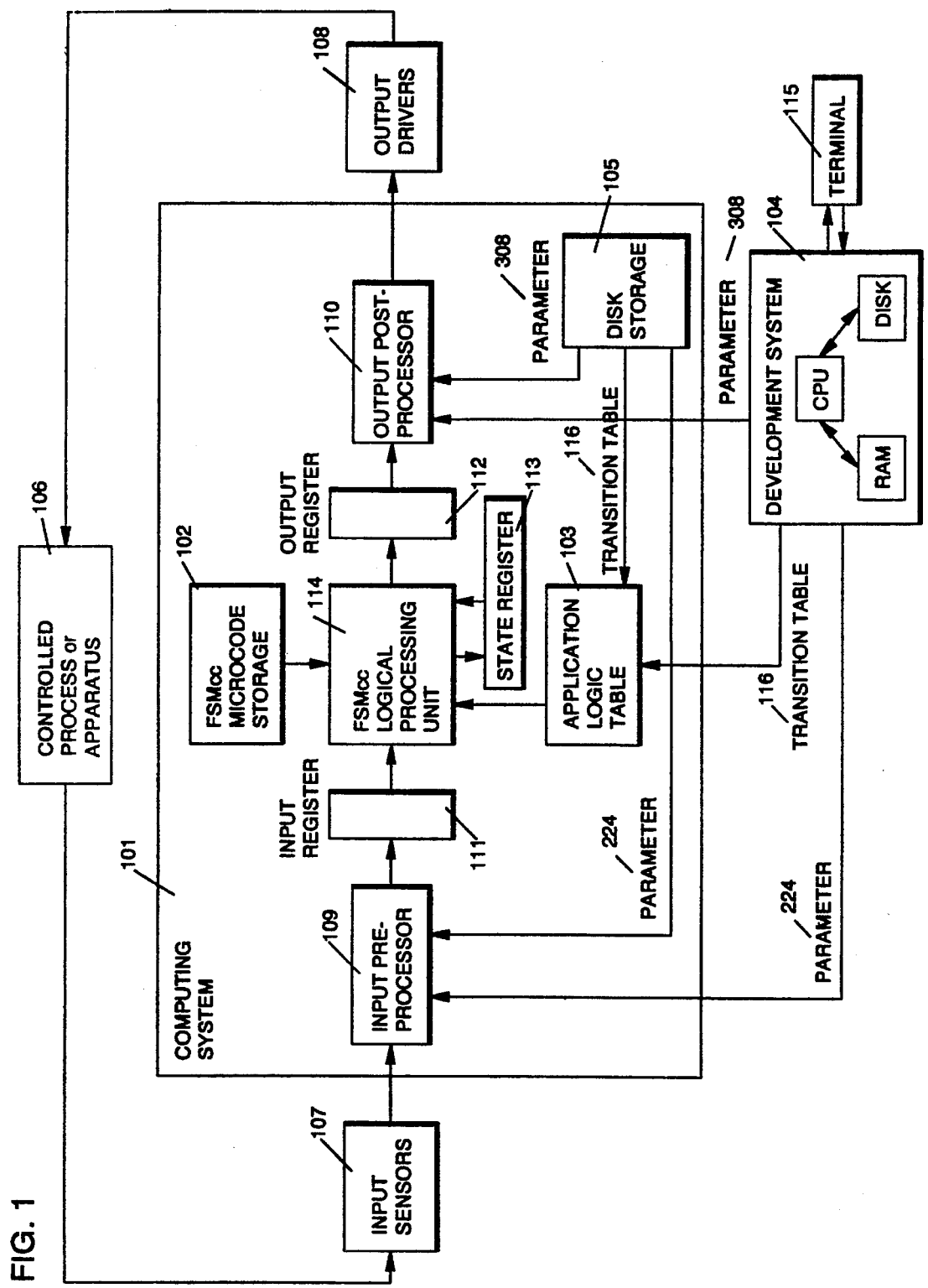
FIG. 1 is a block diagram of the control system based on a finite state machine with constant code (FSMcc).

The present invention applies to computer driven systems which consist of single or multiple finite state machines. The aim of the invention is to build a control system where the control logic is specified in a standard form rather than programmed in any particular language. In the present invention the entire application logic is stored in a table. The program executing the table is constant. The constant execution program is stored in a ROM-type memory in order to assure maximum execution speed.

An important feature of the present invention is that all input signals are brought to a uniform or normalized representation form referred to as "names." Engineering knowledge is required to produce these names. These names are generated by an input preprocessor in the form required by a Finite State Machine with Constant Code (FSMcc). The input preprocessor extracts the names from the input signals. There exists no general solution for construction of the input preprocessor. The same limitation applies to an output postprocessor. The output postprocessor produces the real output signals or performs some actions according to names generated by the finite state machine.

It is assumed in the technical literature that increasing the number of input signals will always require significant increase of memory size. This is indeed true for a pure boolean table representation. The present invention uses input signals in an affirmative form. This leads in a number of cases to substantial reduction of memory size.

The technical literature takes it for granted that increasing the number of boolean operators which are used leads to an optimized form of logical conditions. This appears to be obvious. Based on this assumption, the manufacturers of integrated circuits produce a range of gates which cover all possible boolean operations: AND, OR, NOR, NAND, EXCLUSIVE-OR, NOT, AND-OR-INVERT, etc. This eases the design of circuits by requiring a minimal number of elements. This assumption is correct for systems not exceeding a certain level of complexity. Suprisingly, the present invention demonstrates that limiting the number of boolean operators to two (AND and OR) can be a better approach. This creates a necessary environment for minimizing the memory size containing the logic conditions. This very limited number of boolean operations allows standardization of input signals in an affirmative form and a specific way of storing the logical condition in memory. The AND and OR boolean operators which are used are not explicitly present in the memory which contains the logic conditions. They are implied by an assumed form of the stored conditions. These two features of the present invention lead to a reduction of the memory requirements for storing logic conditions. Thus, using the present invention a control system with hundred of inputs can be implemented as a fully table driven hardware circuit or software program.

The uniform representation of control information does not mean that the number of input signals (names) is minimal. Contrarily, in the case of boolean signals the normalization process may replace one boolean signal with two names. The true advantage is gained in the representation of logical conditions. Names allow for a specific representation of logical conditions. These conditions are stored in tables with significantly smaller sizes. The reduction of table size directly decreases the cost of memory used. In many cases this reduction of table size is so significant that it makes the implementation of a table based system economically feasible.

The size of pure boolean tables as presented in the prior art references cited above would not allow building a system as presented in this invention. An important feature of this invention is that the transition table constructed for the finite state machine uses a new representation of transition conditions. This new representation of transition condition allows building transition tables with reasonable sizes. Therefore, the present invention allows a design of a finite state machine with constant code (the abbreviation FSMcc is used in this description).

Using the present invention the entire control information is contained in data tables. Hence, a wide range of control system modifications is possible without changing the rest of the system. Only the content of memory storing the application control information must be modified.

Still another important feature of systems using the present invention results from the fact that data tables contain control information in a symbolic form (names). The control information expressed by input and output names presents the true application know-how. This information is independent of the language, data base, operating systems, and input-output interfaces used for implementing the control system. Thus, this form of the application know-how is highly portable. It makes possible the re-use of developed subsystems.

If the complexity of the application requires a multiplicity of finite state machines, each machine (if implemented as FSMcc) is executed by the same constant program. The logic specification tables for different FSMccs vary. The organization of each table representing different FSMccs is the same.

The use of finite state machines was limited to simple applications with a small number of states and inputs. The present invention based on FSMcc, may not be a solution for all control problems. But it decisively expands the complexity of applications which can be implemented as a system with a constant code. Design of a fully table based system reduces the debugging effort to testing the application only. The execution part of such a system is designed only once for the entire class of applications.

DEFINITIONS

Terms used in this application have the following meanings:

| | |
|---|---|
| Affirmative signal form | A name given to a signal value which is relevant for control purpose. |
| Combinational system | Output is determined by input. |
| Sequential system | Output cannot be determined by input itself. State and input determine output. |
| State | Represents the past (history) of a sequential system. |
| Moore model | Sequential system which has outputs determined by a state. |
| Mealy model | Sequential system which has outputs determined by a state and inputs. |
| Entry action | Output change when entering a state. |
| Exit action | Output change when exiting a state. |
| Input action | Output change when input changes. |
| Finite state machine | Sequential system. |

Note that the term "finite state machine" is known and used in the technical literature. There are two definitions used. According to the definition used in this description a finite state machine is another name for a sequential system. This view is represented in many books as for example in reference 3 by Kohavi. The other definition says that a finite state machine covers both combinational and sequential systems; this definitions is used for instance in reference 2 by Clare and reference 4 by Hatley.

DETAILED DESCRIPTION OF THE INVENTION

A control system and the method and apparatus for constructing the control system according to the invention is generally illustrated in FIG. 1. It is based on FSMcc which is shown in detail in FIG. 5. FSMcc executes a constant code which is stored for example in microcode storage 102, suitably ROM-memory for greater execution speed. The FSMcc execution code is independent from the application details. The behavior of the control system is determined by the content of a transition table 116 stored in the application logic table 103, suitably RAM-memory. Transition table 116 may be downloaded from a development system 104. If the FSMcc uses a system with a disk storage 105, the transition table 116 can be loaded from the disk storage 105. A computing system 101 controls the process 106. It receives inputs from the controlled process or apparatus 106 by means of input sensors 107. It produces outputs which are supplied to the process 106 by means of output drivers 108. Input register 111 stores names produced by input preprocessor 109. Output register 112 stores names produced by FSMcc.

In one embodiment FSMcc and the disk storage 105 can be based and served by a commercial operating system or a dedicated solution. The input preprocessor 109 and the output postprocessor 110 can be dedicated devices if they perform specialized tasks. They can be built using standard features of the computer system. They can be parts of the same hardware and software as the rest of the FSMcc system.

The input sensors 107 supply signals to the control system. These input signals are of different natures and generally comprise excessive information components. In addition to the information needed for control purposes, the signals carry irrelevant information. The task of the input preprocessor 109 is to extract the true control information and pass it further to the FSMcc in a normalized form. Examples of how to extract the control information are given in FIG. 2A to FIG. 2B.

The FSMcc produces outputs in a normalized form representing the action to be performed. These FSMcc outputs are processed by output postprocessor 110. The output postprocessor 110 generates signals required by specific drivers, attenuators, relays, motors and other output actuators. Examples of output postprocessor 110 are given in FIG. 3A and FIG. 3B.

Input preprocessor 109 may receive parameters 224 and output postprocessor 110 may receive parameters 308. The parameters adapt the preprocessor and postprocessor to a specific variant of the controlled system 106. The parameters are loaded either from the development system 104 or from the disk storage 105.

In the present invention, control information contained in the real input signals is normalized to a standard form of names. This form is required for FSMcc. As illustrated the normalization process is done by input preprocessor 109. The form of the normalized standard inputs for the FSMcc should meet the three criteria specified below: First, each basic unit of information (input) representing control information about a real input is only in an affirmative form. Such a basic unit of information will be further referred to as a "name". Second, each name is represented by some basic data item (e.g. a bit). Third, all names form a uniform list stored in an input register for processing by FSMcc.

Figure 2A:
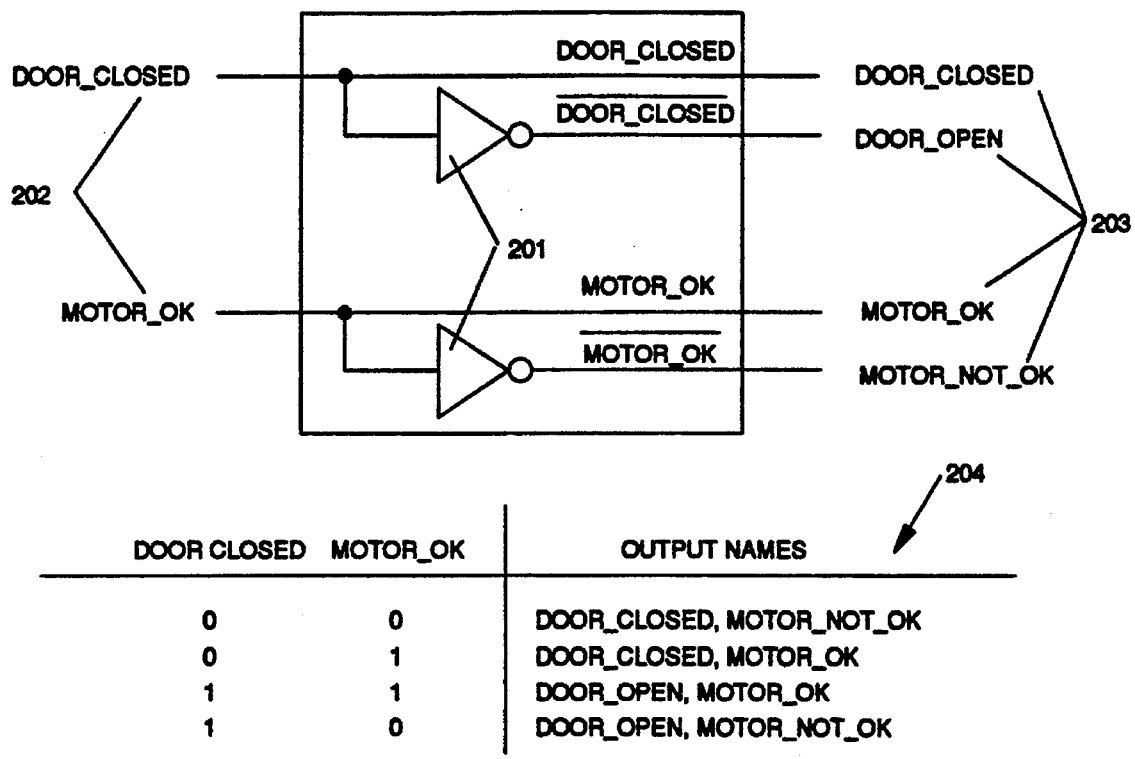
FIG. 2A to FIG. 2C are schematics showing implementation examples of the input signal preprocessor.
Figure 2B:
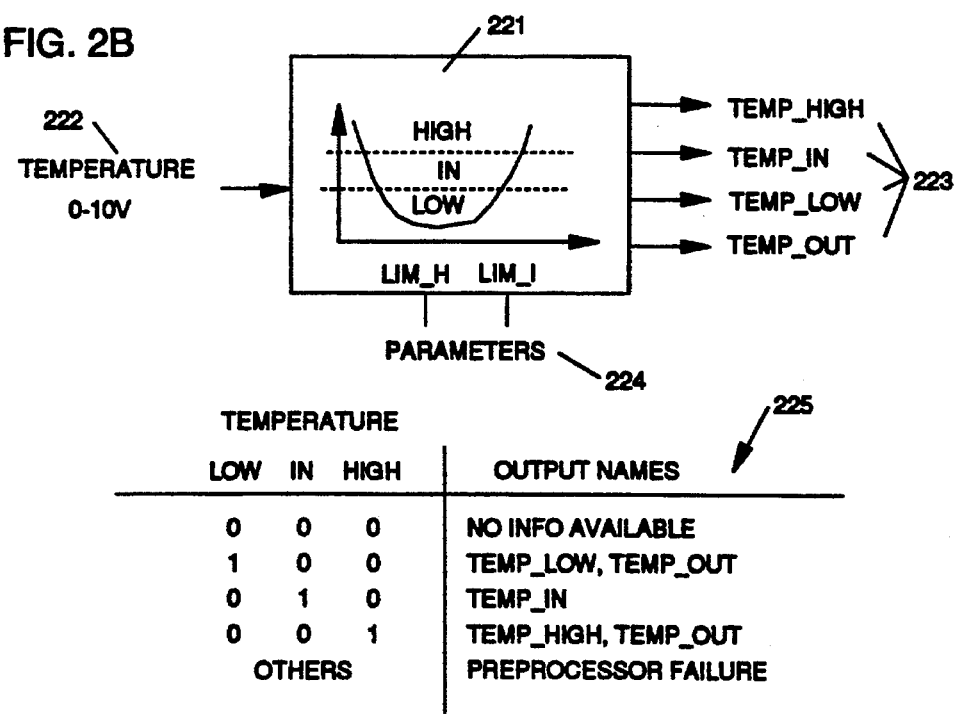
Figure 2C:
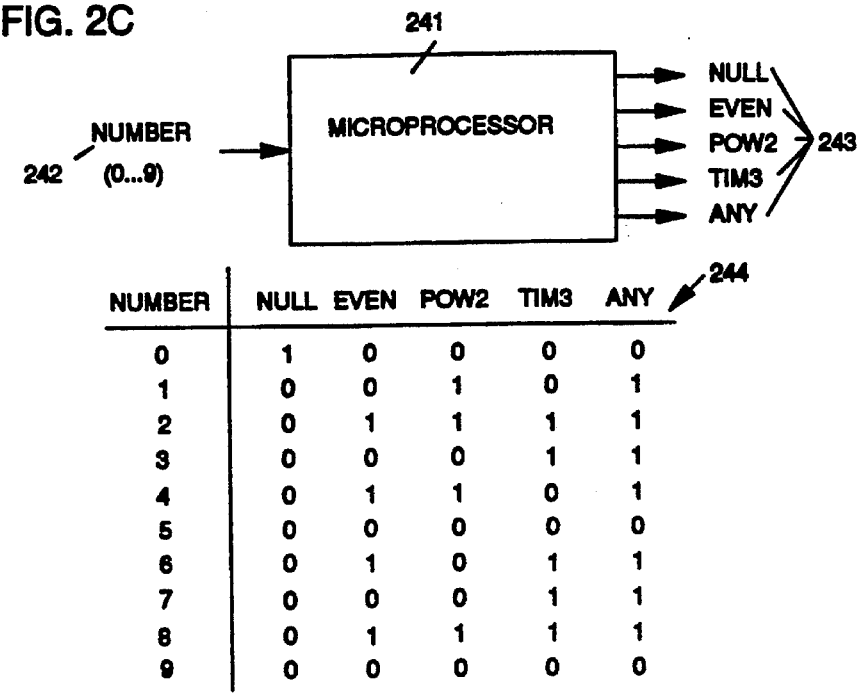

Three tested constructions of the input preprocessor 109 are shown in FIG. 2A to FIG. 2C. FIG. 2A shows the simplest implementation for normalization of boolean signals. It uses two invertors 201. The real inputs in FIG. 2A are boolean signals 202 (DOOR_CLOSED and MOTOR_OK). In this case, the preprocessor doubles the number of signals producing separate names 203 for TRUE and FALSE values of the real input signals 202. Hence, instead of operating with a signal 202 (DOOR_CLOSED which could have TRUE and FALSE values) FSMcc will be supplied by two names 203 (DOOR_CLOSED and DOOR_OPEN). Only one of these names can be present. If both are absent, it means that the value of the input signal 202 (DOOR_CLOSED) is not known. If both are present, it means that the preprocessor has either a design error or has failed (is damaged).

The real input signal 202 (MOTOR_OK) is replaced by two names 203 (MOTOR_OK and MOTOR_NOT_OK). The table 204 summarizes the possible combinations of output names 203 in dependence of the boolean values of the input signals 202. In this example, the preprocessor doubles the number of input signals replacing two boolean input signals 202 with four names 203. The actual number of input names in the input word 203 depends on the application. Only the names used for representing control information should be generated.

FIG. 2B shows an implementation of a preprocessor for an analog signal. The real input 222 is a voltage between zero and ten volts representing temperature. The preprocessor is a voltage discriminator 221 which produces four names 223 (TEMP_LOW, TEMP_OK, TEMP_HIGH and TEMP_OUT). The thresholds levels (LIM_H and LIM_L) can be adjusted as required by process parameters 224. The process parameters are stored on the disk storage 105 and loaded from there when necessary. This happens at least during system initialization. These four names 223 are the only control information relevant for the purpose of the controlled application. The table 225 in the FIG. 2B defines the possible combination of names 223 produced by the preprocessor. Any other situation is erroneous and would mean that the preprocessor has failed.

The example in FIG. 2C presents a preprocessor working with input 242 being a number between zero and nine. The task of the preprocessor is to select for any combination of the input number 242 required names 243. An example of the required names 243 (NULL, EVEN, POW2, TIM3, ANY) is given in the accompanying table 244. In this particular example, more than one name 243 can be generated simultaneously. Such a preprocessor 241 with a more complex task might be implemented using a dedicated circuit or a microprocessor.

Logical conditions which determine transitions and actions in a finite state machine depend not only on signals produced by the input sensors 107. They contain terms which are defined by parameters. The parameters are stored in memory as on disk storage 105 or are loaded from the development system 104. Parameters 224 are used to determine conversion values in the input preprocessor 109 as in example in FIG. 2B. Parameters 308 are used to define conversion factors in the output postprocessor 110. An example will be shown later in the description of FIG. 3B. Some parameters may also set explicitly names in the input register 111. In such a case they are directly processed by the input preprocessor 109 to produce required names. These parameter-dependent names are seldom changed. Usually, they stay in the input register 111 as set during a start-up. Sometimes, they are changed according to an action which says e.g. "load_new_parameters". Names in the input register which correspond to parameters allow a control system to be customized. They allow the same transition table to be used for different variants of the control system.

In general, a system designed according to the present invention has means (represented in this description by the input preprocessor 109) to produce names for all information essential for the control purpose. The main stream of information comes from the input sensors. But there are also other sources of control information, the parameters being an example. All such information must have corresponding names in the input register 111, because the control is performed exclusively with these names.

Figure 3A:
FIG. 3A and FIG. 3B are schematics showing implementation examples of the output signal postprocessor.
Figure 3B:
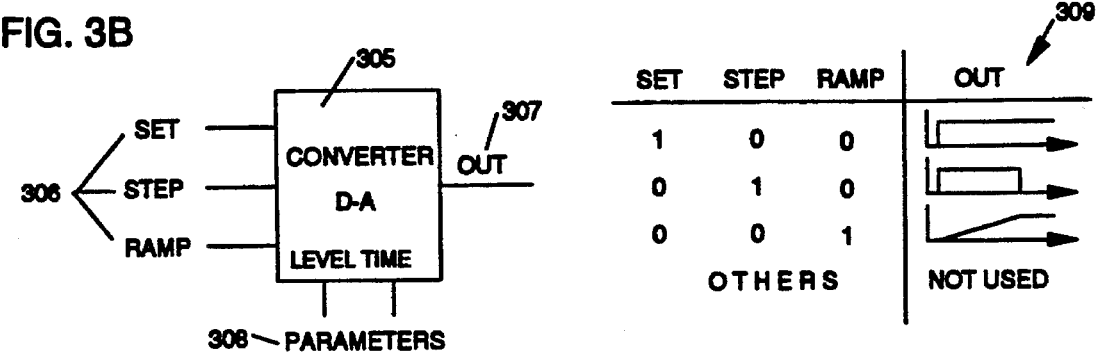

FSMcc produces output signals which are uniform names. The names at the output describe the values or actions and must be changed into real values. The real output signals are produced from names by a circuit or computer based output postprocessor 110. The output of FSMcc forms a list of symbols or output names. The task of the postprocessor is to change the names into real signals. FIG. 3A and FIG. 3B show two examples of implementing such a postprocessor. In FIG. 3A, a flip-flop 301 is used to change a pair of output names 302 (CMD_ON and CMD_OFF, where cmd stands for command) into a boolean signal 303 (MOTOR_ON) which has two values —TRUE and FALSE (represented by high and low voltage levels). It is assumed that FSMcc producing the output names will never generate both names 302 (CMD_ON and CMD_OFF) simultaneously. The table 304 summarizes the possible boolean values of the output 303 in dependence of the names 302.

The circuit in FIG. 3B produces an analog output signal 307 as a response to three possible output names 306 (SET, STEP AND RAMP). The names 306 produced by FSMcc define only the type of the analog output—set constant voltage (SET), set voltage for a certain time period (STEP) or set voltage which rises to a given value in a certain time period (RAMP). A specialized D-A (digital-to-analog) converter 305 generates the required output signal 307 (OUT). To produce the required form of the output signal 307 the D-A converter 305 receives parameters 308 (LEVEL and TIME). The parameters are stored in memory 105 and loaded when necessary at least during system initialization. The table 309 summarizes the possible shapes of the analog output 307 in dependence of the names 306.

Input preprocessor 109 and output postprocessor 110 do not always belong to separate physical entities. They can be physically encapsulated as an input-output module containing digital input circuits, digital-to-analog convertors, analog-to-digital convertors, digital output circuits, etc.

The input preprocessor 109 and output postprocessor 110 are used to isolate FSMcc from the real signals. FSMcc operates in a standard, uniform environment where its input is an input word. The input word is a list of input names. FSMcc produces an output word which is a list of output names. These names create a virtual environment for FSMcc. FSMcc is a virtual finite state machine. Construction of the virtual environment achieves a fully table driven finite state machine with constant code (FSMcc).

The examples of input processor 109 in FIGS. 2A, 2B, 2C and the examples of output postprocessor 110 in FIGS. 3A and 3B demonstrate the true value of using symbolic expressions (names) to specify and implement the control problem. For instance, the input names (DOOR_CLOSED and DOOR_OPEN) are the only known symbols used to express the position of a door in all logic conditions in FSMcc. Assume for some reason that in operation the input sensor which detects the door position is changed. For example, the signal polarity will be reversed (TRUE means door open) or the boolean signal will be replaced by multivalued signal (door_open, door_closed, door_undefined). The changes in the system do not influence the control part stored in application logic table 103 and they are limited to changes in the input preprocessor 109.

A similar separation effect is achieved on outputs when using the present invention. Assume that the control details of switching the motor in FIG. 3A on or off change. For example, a motor needs reverse polarity signals for switching on and off or the motor is a part of a more complex subsystem requiring some ASCII strings which are interpreted as commands. The changes are limited to those in the output postprocessor 110. The control logic stored in the application logic table 103 is not influenced by changes which take place on the real side of the controlled system.

Similarly, if the control conditions which use the input names (DOOR_CLOSED and DOOR_OPEN) are adapted to new application requirements the input preprocessor 109 is not affected by the changes. The changes are limited to bit patterns stored in the application logic table 103. Similarly, the changes in the conditions which produce the output names do not influence the output postprocessor 110.

The logic of a given application is entirely expressed in a table stored in the application logic table 103. The application logic table 103 defines transitions and actions. For each state the transitions define new states and conditions which lead to the new state. For each state the actions are performed if certain conditions are fulfilled. In order to reduce the size and cost of memory, the information about the state transition conditions as well as the information about the action conditions are placed in a data table in an optimized form.

The basic logic item used to express logic condition is a control word which is a list of input names. Names in the control word are treated as being linked together with the implied boolean AND operator. A group of control words is treated as they were linked together with the implied boolean OR operator. In the present invention, these are the only allowed forms which are used to express logic conditions. In contrast to conventional systems based on boolean expressions, the NOT operator is not used.

Figure 4:
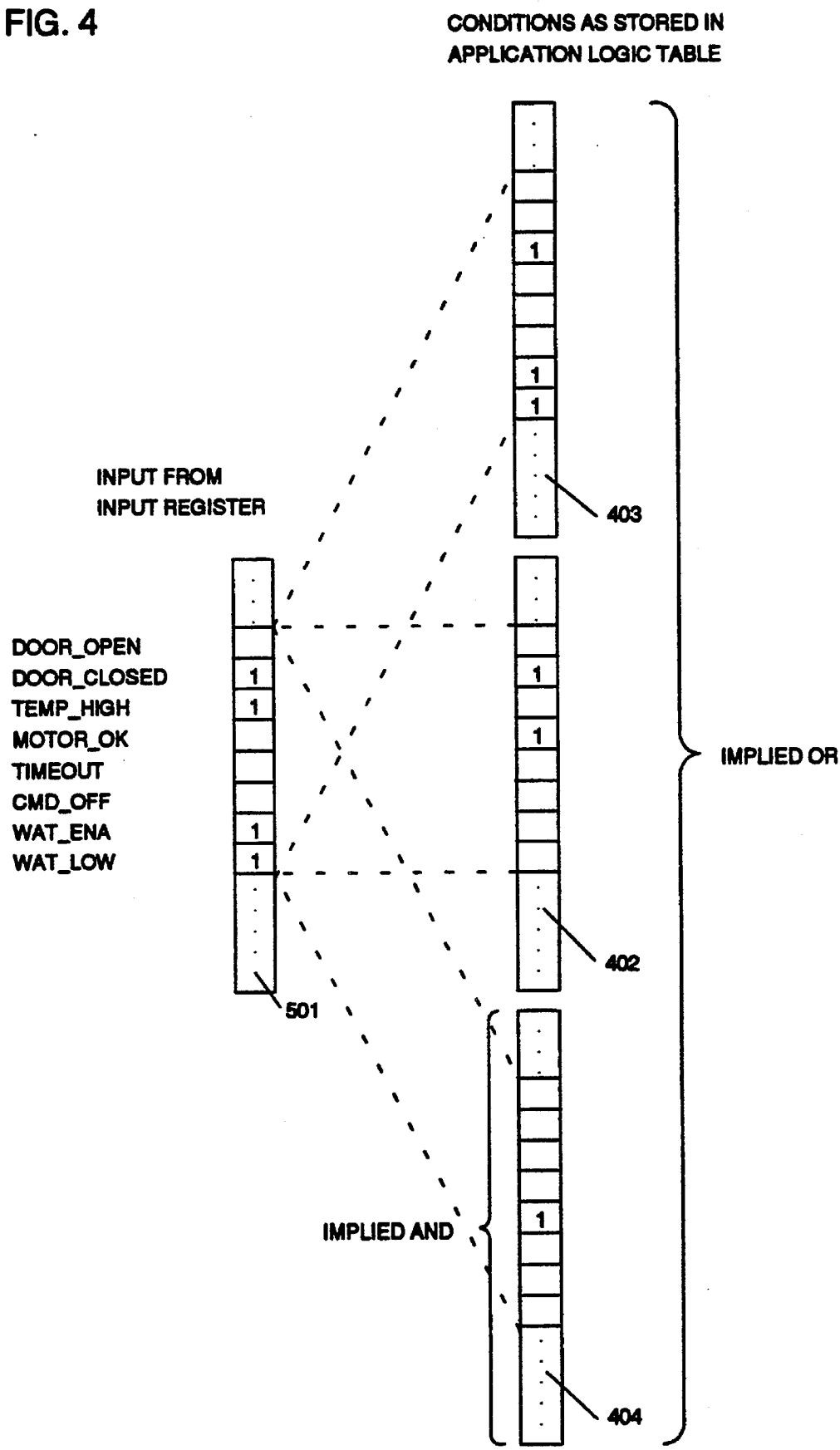
FIG. 4 shows a graphical presentation of control words stored in FSMcc's registers and memory.

FIG. 4 presents an example of implementation of logical conditions in a system which may be represented by three AND conditions (TEMP_HIGH, WAT_LOW, WAT_ENA), (DOOR_CLOSED, MOTOR_OK), and (TIMEOUT). All names are explained in FIG. 7 (e.g. WAT_ENA stands for "water_enable"). Expressions in a parenthesis correspond to one AND condition. In the tested application, the input word 501 as well as the conditions expressed by control words 402 through 404 have been implemented as words where each bit represents one name. The bits representing the names of a specific AND expression are marked in FIG. 4. They have value 1 and the other bits have value 0 represented by an empty space. This convention is used in the example in FIG. 4 and in all other figures in this description. In the present invention, the test of the logic conditions is made by comparing the control words 402 through 404 stored in the application logic table 103 against the content of the input word 501 stored in the input register 111. If all 1's in any of the control words 402 through 404 match 1's in the input word 501, the condition is TRUE because the AND conditions represented by the control words are linked together by the implied OR operator. In other words, a condition is TRUE if names represented by 1's in any of the control words stored in the application logic table 103 are a subset of names represented by 1's stored in the input register. In the example in FIG. 4, all 1's in the control word 403 match 1's in the input word 501. Hence, the condition is TRUE.

Figure 5:
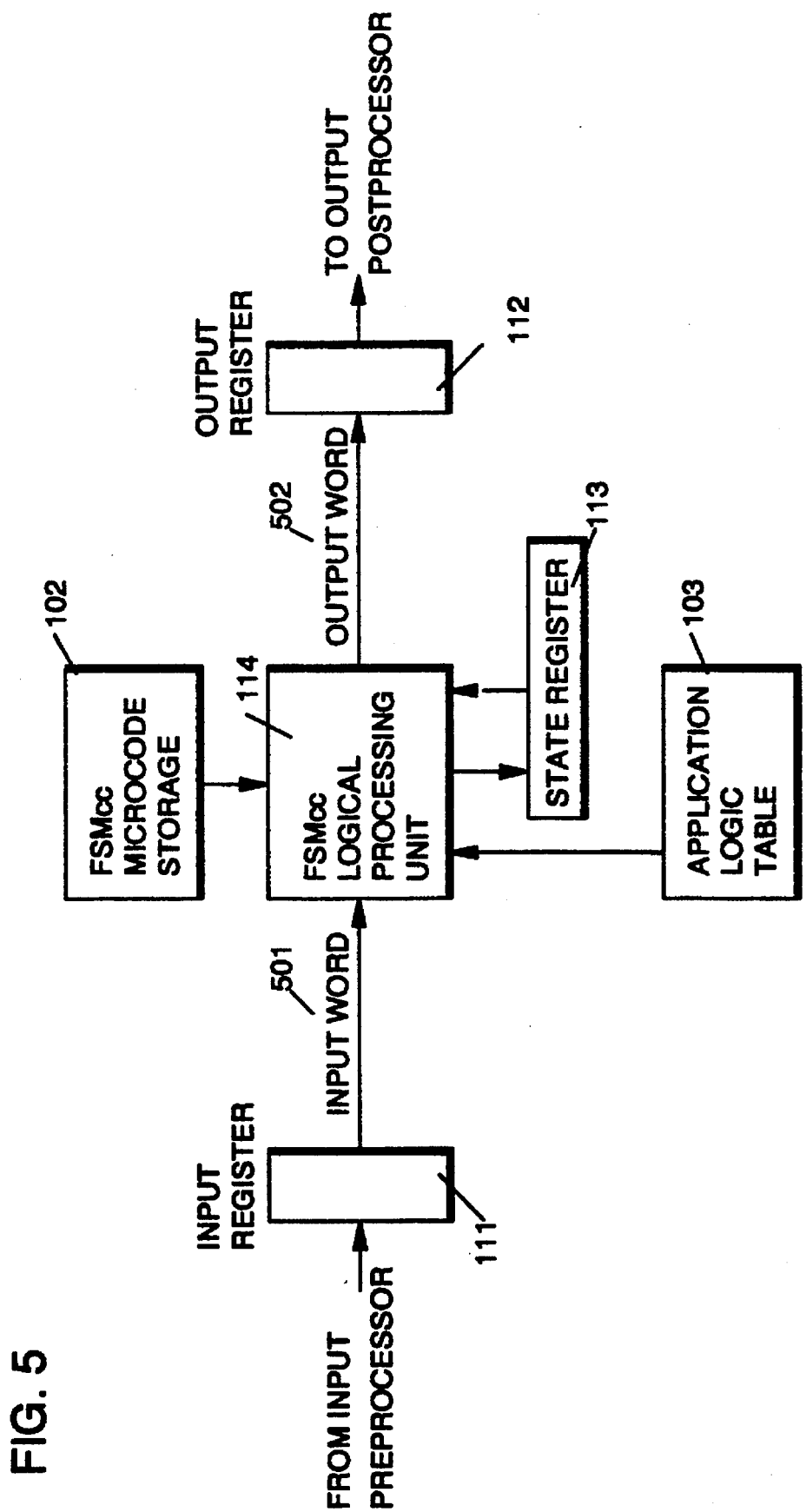
FIG. 5 is a block diagram showing components of FSMcc.

A schematic diagram of FSMcc is shown in FIG. 5. The basic element is a FSMcc logical processing unit 114 which processes an input word 501 and generates an output word 502. The input word 501 is stored in the input register 111 and is supplied there by the input preprocessor 109. The output word 502 is stored in the output register 112 and is passed from there to the output postprocessor 110. The state of FSMcc is stored in a state register 113. The FSMcc Logical processing unit 114 executes a constant program stored in a FSMcc microcode storage 102. The task of the FSMcc program is to process content of the application logic table 103.

Figure 6:
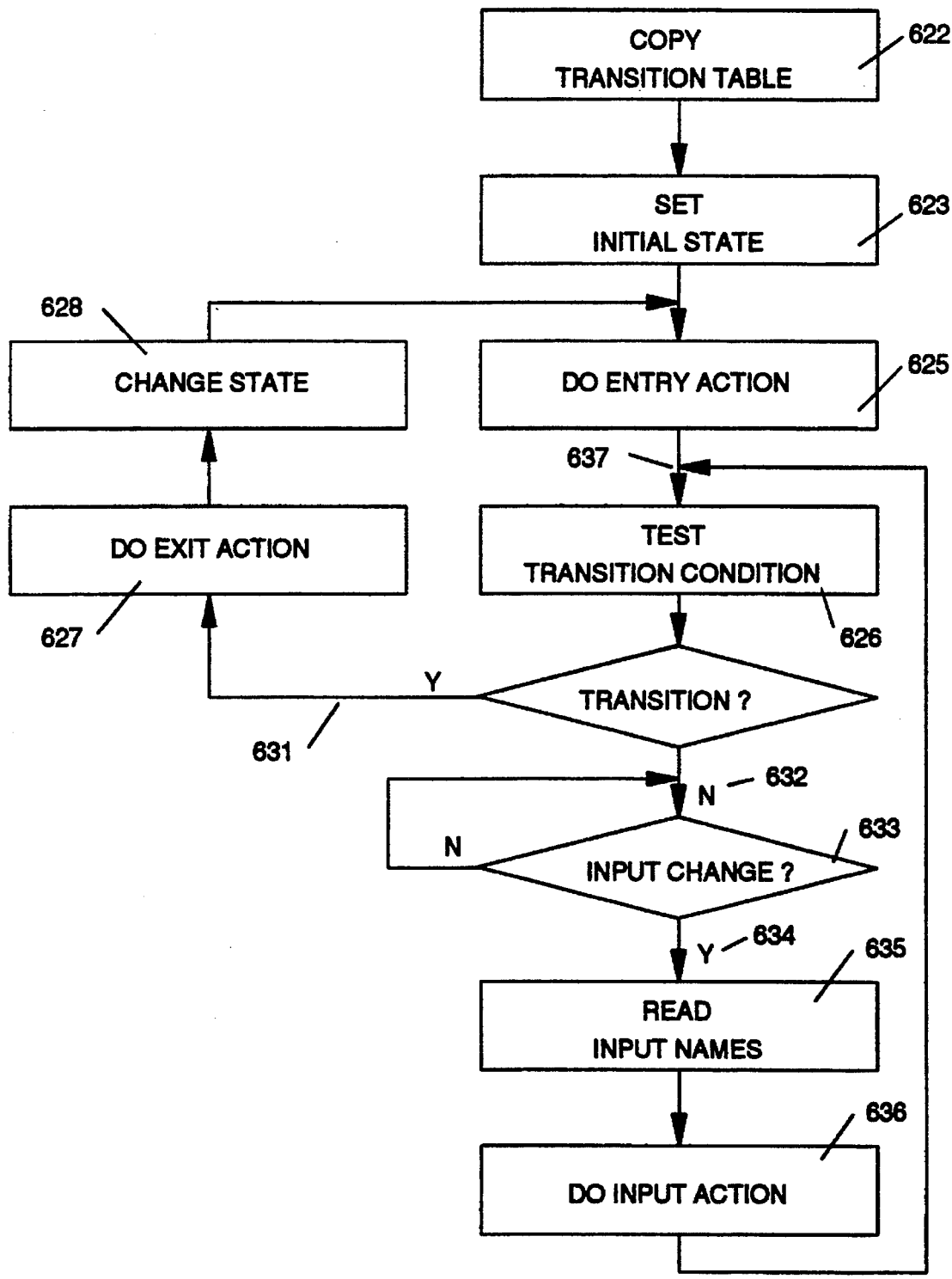
FIG. 6 is a flowchart showing the execution sequence for FSMcc.

FSMcc logical processing unit 114 processes the input word 501 executing the constant code stored in the FSMcc microcode storage 102. The code depends on the assumed model of the finite state machine. FIG. 6 presents a flowchart of FSMcc logical processing unit 114 (microcode executor) used to test the present invention. This finite state machine has combined features of the Mealy and Moore models. The FSMcc logical processing unit 114 performs three types of actions: entry actions 625, exit actions 627 and input actions 636. According to the flowchart in FIG. 6, entry actions 625 are executed only once in a state when entering the state. The exit actions 627 are done once when leaving a state. The input actions 636 are performed always when the content of the input register has changed. With this model of a finite state machine, a complex control system has been tested. Such a model of a finite state machine allowed testing of transition conditions and conditions for input actions. Both were expressed as control words stored in the application logic table 103 as described herein.

After power-up, the FSMcc logical processing unit 114 executes the code performing the initialization phases 622, 623. It copies 622 the application table from storage 105 into the application logic table 103 and sets 623 an initial value of a state in the state register 113. Then FSMcc enters endless loops executing the following steps. It performs entry actions 625 in the actual state reading the output word 502 of output actions for this state stored in the application logic table 103 and sending them to the output register 112. Then it tests 626 whether any transition is due. This is done by comparing the content of the input register 111 with control words stored in the application logic table 103 describing transition in the actual state. If a transition to a new state can be done 631, it performs the exit actions 627 reading their names from the application logic table 103 and sending them to the output register 112. Then it changes 628 the state. It continues this loop 625, 626, 627, 628 until there are no more transitions possible 632. In this case, it begins the other loop—halts and waits 633 for an input change 634. The input change 634 means a change in the content of the input register 111. When this happens, FSMcc logical processing unit 114 reads 635 the input word and starts executing the input actions 636. It reads the input action names from the application logic table 103 and sends them to the output register 112. Then it returns to the point 637 in the loops continuing the previously described steps.

The finite state machine as described by the flowchart in FIG. 6 represents one possible implementation model. Because of its relatively high flexibility, this specific model has been chosen for testing purposes. However, this should not be construed as limiting the scope of the invention but as merely providing illustration of some of the presently preferred embodiments of this invention. A conventional finite state machine per se is not a subject of the present invention.

METHOD AND APPARATUS FOR SYSTEM GENERATION

A finite state machine which describes an application or controlled process or apparatus is specified and implemented using names which form the normalized environment in which FSMcc operates. Design of the finite state machine for specific application begins with building a list of input names which will form an input word 501 and a list of output names which will form an output word 502. The names must correspond to control information relevant to the specific application process. Hence, the names are derived from observation of control information.

FIG. 7 presents examples of input names which have been used in testing the present invention. A designer is completely free in chosing names. A boolean signal 701 may be replaced by one name, or two names if both values of the signal are used while describing the application logic. A range of input signal values may be replaced by one name. For instance, the digit values 702 from 1 through 9 has been replaced by one name 703 (ANY). A whole range of signal input values 705 may be neglected (not used), e.g. the counter values 704 from 2 to a max-1. One signal input value may generate more names as the discriminator signal 706 in the example. The value 0 is replaced by two names 707: TEMP_HIGH and TEMP_OUT. The value 2 is replaced by names 708: TEMP_LOW and TEMP_OUT.

The boolean parameter 709 has been separated from the boolean signals 701 to underline its different origin. A parameter is not produced by a sensor. It is an item of information loaded from a disk storage 105 or other memory or from a development system 104. It defines the actual variant of a control system. The input preprocessor 109 changes the parameter to a name or names exactly as other input signals.

The example in FIG. 7 demonstrates that using the present invention does not require boolean signals to be treated in a distinctive manner. All signals are equal and the role of the control system designer is to extract the true control information by giving the real values of signals appropriate names. Thus, the boolean signal is treated as having a maximum of two values. If both of them have a control significance, two symbols (names) are produced. If only one boolean value is used for expressing the logic conditions, only one name must be generated by the input preprocessor 109. Only these input names can be used to build a state transition table. The input names are used to express the control associations leading to state transitions. These control associations are expressed as logical conditions in the transition table. The only boolean operators allowed are AND and OR. The NOT operator must not be used. The same rules apply to choice of output names. The output names are used to express the actions to be performed by the finite state machine.

The state transition table defines the content of the table stored in the application logic table 103 used by FSMcc. An example of the transition table of a tested application is shown in FIG. 8A. This table describes transitions and actions for one state. The STATE_ON 801 can change to STATE_OFF 802 if the condition CMD_OFF 803 is fulfilled. The STATE_ON 801 can change to STATE_IDLE 804 if a complex logical condition is TRUE—one of three control words 805 (DOOR_CLOSED, MOTOR_OK), (TEMP_HIGH, WAT_LOW, WAT_ENA) or (TIMEOUT) is a subset of input word 501. The STATE_ON 801 can change to STATE_ERROR 806 if one of two control words 807 (DOOR_OPEN, TEMP_HIGH) or (DOOR_OPEN, WAT_LOW, WAT_ENA) is a subset of input word 501. When entering the STATE_ON 801, two entry actions 808 (MOTOR_ON, START_TIMER) are performed—a motor and a timer are started. When leaving the STATE_ON 801 the exit action 809 (STOP_TIMER) is performed—the timer is halted. If one of control words 810 (TIMEOUT) or (WAT_LOW, WAT_ENA) is a subset of the input word

501, the input action 811 (ALARM_MOTOR_NOT_OK) is carried out—an alarm is generated. If a control word 812 (TEMP_HIGH, DOOR_OPEN) is a subset of the input word 501, the input action 813 (ALARM_TEMP_HIGH) is carried out—an alarm is generated. If a control word 814 (DOOR_OPEN, MOTOR_OK) is a subset of the input word 501, two input actions 815 (ALARM_DOOR_OPEN, MOTOR_OFF) are carried out—an alarm is generated and the motor is halted.

Using an appropriate tool, the transition table in the form shown in FIG. 8A is translated to the binary form stored in the application logic table 103.

Figure 8B:
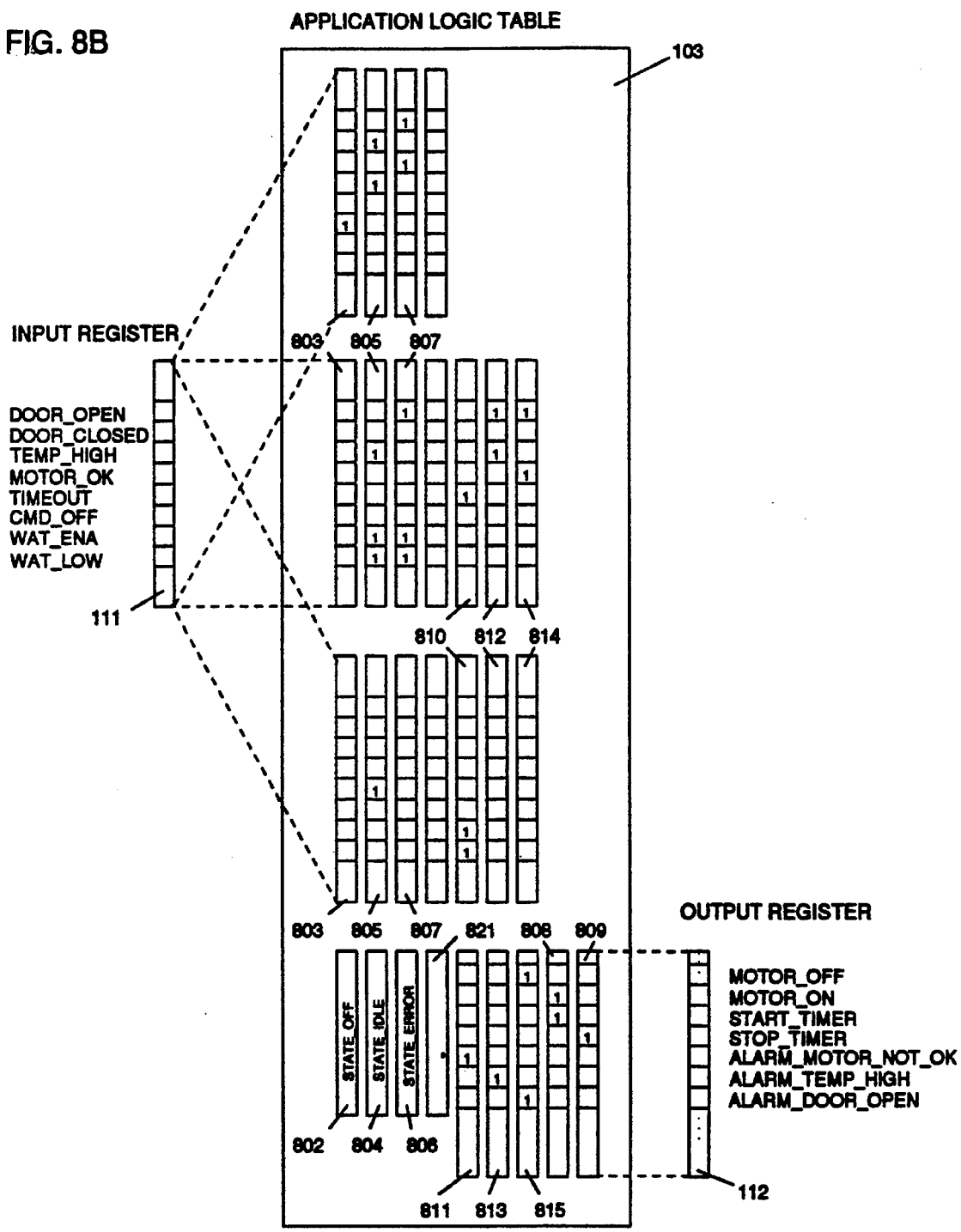
FIG. 8B shows the table from FIG. 8B stored in a memory as described in the present invention.

FIG. 8B shows how the transition table from FIG. 8A is stored in application logic table 103 using the technique as described in the present invention. The entire control information which has been expressed in FIG. 8A using uniform names is stored as control words where each bit represents one name. For clarity, the control words in FIG. 8B are not arranged exactly as actually stored in computer memory. In the computer memory the content of the application logic table 103 is prepared by a translating program. The drawing shows exactly the same information for one state (STATE_ON) which has been presented in FIG. 8A. In this example the following assumption has been made considering the maximum sizes of stored information: First, from a given state only a maximum of four transitions are possible. This means a state can have a maximum of four next states. Second, transition conditions are limited to a maximum of three control words each corresponding to an AND condition. Third, the number of different groups of input actions is limited to three. Fourth, action conditions are limited to a maximum of two control words which correspond to an AND condition.

The content of words which store the three possible next states 802, 804, 806 is marked symbolically with their names: STATE_OFF, STATE_IDLE, STATE_ERROR. The form of this information is not important in the context of the present invention. In the test application the names were enumerations or sets. The word 821 is to store the fourth name of the next state. It is empty as not used in STATE_ON. Each word 802, 804, 806 is linked with a group of three control words 803, 805, 807, each comprising the transition conditions as specified in the table in FIG. 8A. For instance, the first control word 805 (counted from top of the drawing) contains 1's on positions which correspond to the group of names (DOOR_CLOSED, MOTOR_OK). The second control word 805 contains 1's on positions which correspond to the group of names (TEMP_HIGH, WAT_ENA, WAT_LOW). The third control word 805 contains 1's on positions which correspond to the group of names (TIMEOUT). The same correspondence applies to control words which contain transition conditions for next states—STATE_IDLE 804 and STATE_ERROR 806.

The names of input actions 811, 813, 815 are stored as bits in words which are linked with a group of three control words 810, 812, 814, each comprising the control words expressing the action conditions as specified in the table in FIG. 8A. For instance, the first control word 810 (counted from top of the drawing) contains 1's on positions which correspond to the input name (TIMEOUT). The second control word 810 contains 1's on positions which correspond to the input names (WAT_ENA AND WAT_LOW). The same correspondence applies to control words which contain input conditions for the other two possible input actions—813 and 815. The names of entry and exit actions are stored as bits in separate words—808 and 809, which are not linked with any control words as they are unique for each state.

The form of the data structures in the application logic table 103 depends on the hardware used and the tools, which translate the symbolic program expressions into binary words stored in computer memory.

TABLE 1 shows definitions of data structures used to test the present invention. The language used was extended PASCAL ELN as used on real time VAX computers. The CONST declaration part comprises the maximum number of transitions (3), conditions (1),(2), and actions (4). The values chosen in TABLE 1 are equal to the values used in FIG. 8B. The TYPE declaration part begins with definitions of state names (5), input names (6) and output names (7). All names used have been taken from the example in FIG. 8A. The dots in the enumerations (5), (6) and (7) replace names which are used when specifying a complete finite state machine. A simplest word which could be used to store one AND condition—control word as described in the present invention is an array of boolean, each bit representing one input name. To simplify logical operations, a set (8) has been declared. It corresponds to an array of boolean on the binary code level. Similarly, a set (9) has been declared to be used for output names. The array (10) corresponds to one logical condition which defines a transition condition, for instance 803, 805, 807. The array (11) corresponds to one logical condition, which defines an action condition, for instance 810, 812, 814. The record (12) links an input action with its input condition, for instance 811 and 810. The array (13) declares a structure which contains all input actions for one state. The record (14) links a next state with its transition condition as for instance 802 and 803. The array (15) declares a structure which contains all transitions for one state. The record (16) links all control information which describes one state—transition (next), input actions (action), entry actions (entry) and output actions (exit). The array (17) declares a structure which contains control information for all states. In the VAR declaration section, the transition table is declared as a variable c_states (18) of type a_states (17). This variable is initialized to a value which contains the description of transition table. TABLE 1 shows the content of the initializer (19) for one state. The dots replace the values which must be written defining a complete finite state machine. The values in the initializer (19) are taken from the transition table in FIG. 8A.

Using appropriate translation tools a specification table in FIG. 8A is translated into a binary file. The binary file is loaded and is used to initialize the c_states variable (18).

TABLE 1

DATA STRUCTURES IN EXTENDED PASCAL FOR TABLE IN FIG. 8A

CONST

| | | |
|---|---|---|
| max_tcond = 3; | | (1) |
| max_acond = 2; | | (2) |
| max_transition = 4; | | (3) |
| max_action = 3; | | (4) |

TYPE

| | | |
|---|---|---|
| e_state = | ( . . . | (5) |
| | state_off, | |
| | state_idle, | |
| | . . . | |
| | state_on, | |
| | . . . | |
| | state_error | |
| | . . . ); | |
| e_input = | ( . . . | (6) |

TABLE 1-continued

DATA STRUCTURES IN EXTENDED PASCAL FOR TABLE IN FIG. 8A

```
                    door_open,
                    door_closed,
                    temp_high,
                    motor_ok,
                    timeout,
                    cmd_off,
                    wat_ena,
                    wat_low,
                    ... );
e_output =          ( ...                               (7)
                    motor_off,
                    motor_on,
                    start_timer,
                    stop_timer,
                    alarm_motor_not_ok,
                    alarm_temp_high,
                    ... );
s_input = PACKED SET OF e_input;                        (8)
s_output = PACKED SET OF e_output;                      (9)
a_tterm = PACKED ARRAY [1..max_tcond] OF                (10)
    s_input;
a_aterm = PACKED ARRAY [1..max_acond] OF                (11)
    s_input;
r_action = RECORD                                       (12)
    cond : a_aterm;
    act : s_output;
END;
a_action = PACKED ARRAY [1..max_action] OF              (13)
    r_action;
r_transition = RECORD                                   (14)
    state : e_state;
    cond : a_tterm;
· END;
a_transition = PACKED ARRAY                             (15)
    [1..max_transition] OF r_transition;
r_state = RECORD                                        (16)
    next : a_transition;
    entry : s_output;
    exit : s_output;
    action : a_action;
END;
a_states = ARRAY [e_state] OF r_state;                  (17)
VAR
    e_states   : a_states : = (                         (18)
    ...
    {state_on}                                          (19)
        ( {next}    ((state_off,    ([cmd_off],
                                    [ ],
                                    [ ])),
                    (state_idle,    ([door_closed, motor_ok],
                                    [temp_high, wat_low,
                                    wat_ena]
                                    [timeout])),
                    (state_error,   [door_open, temp_high],
                                    [door_open, wat_low,
                                    wat_ena],
                                    [ ]))
        ),
        {entry}     [motor_on, start_timer],
        {exit}      [stop_timer],
        {action}    ((([timeout], [wat_low, wat_ena]),
                    [alarm_motor_not_ok]),
                    (([temp_high, door_open], [ ]),
                    [alarm_temp_high]),
                    (([motor_ok, door_open],[ ]),
                    [alarm_door_open, motor_off])
                    )
        ),
        ...
    );
```

Extraction of control information in the form of names and the technique of storing logic conditions as control word results in a considerable decrease of memory size needed for storing the control data. An example presented in FIG. 9A and FIG. 9B shows the effects which can be obtained even in a very simple, combinational case.

FIG. 9A comprises the original specification of the output Y dependent on two inputs A and B, and the solution with a direct table. The input A can have values between zero and twenty, the input B can have values between zero and ten. The output Y can have values between zero and two. The table 901 describes the problem defining required output values depending on inputs A and B. If the table is stored, for instance, in a ROM memory 902 (representing the direct solution) it requires $$21 \times 11 = 231 \text{ bytes of memory.}$$

This assumes that the output will be stored in bytes.

Figure 9B:
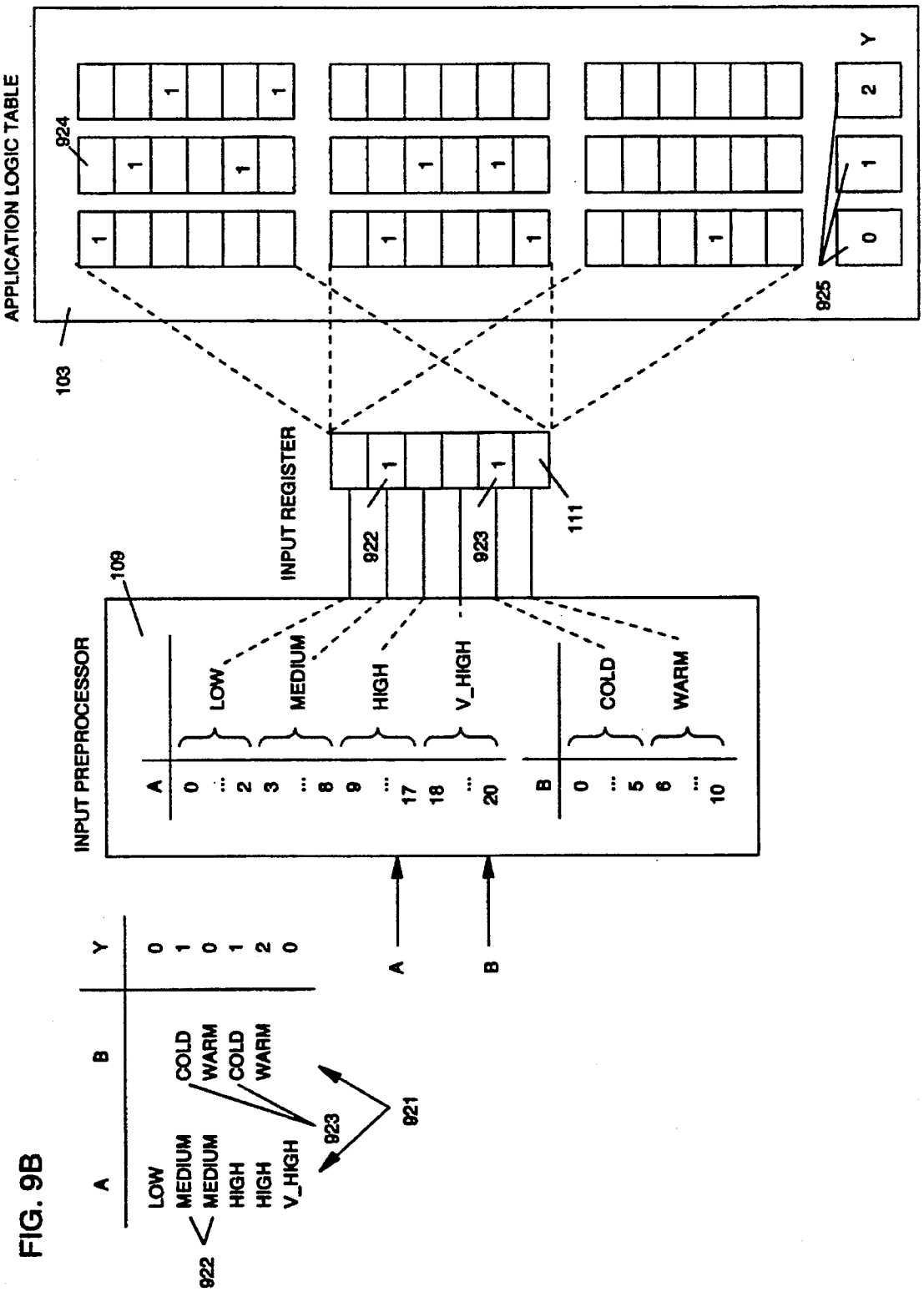
FIG. 9B shows the table from FIG. 9A stored in memory as described in the present invention.

FIG. 9B shows the solution using the technique as presented in this invention. The specification table 901 has been rewritten with names 921 (LOW, MEDIUM, HIGH, V_HIGH, COLD, WARM). The FIG. 9B shows how the inputs A,B are changed to names 921 and used to generate the output Y. This is done by comparing the list of names stored (input word) in the input register 111 with condition (control words) stored in application logic table 103. For instance, if the input A is in the range 903 (3 . . . 8) and the input B is in the range 904 (0 . . . 5) the input preprocessor 109 generates two names—MEDIUM 922 and COLD 923, and puts them in the input register 111. An execution unit functioning as a logical processing unit compares the content of the input register 111 with the content of application logic unit 103. It will find a match with a control word 924 which describes the output value 925 (Y=1). The input preprocessor 109 needs for storing the conversion table:

$$21 + 11 = 32 \text{ bytes.}$$

The output Y is stored in the application logic table 103 as $$3 \times 3 = 9 \text{ bytes.}$$

Thus, the overall size of memory requirement is only 41 bytes instead of 231 bytes.

The memory saving when using the present invention increases with the number of inputs and their value range. The comparison is made with respect to the direct table approach. Using a direct table each new input multiplies the size of a table by its number of possible values. A table for ten inputs, each having ten values would have ten to tenth power entries. Assuming that information relevant for the specified logic condition is contained an average of 3 names per input, the 10 inputs can be replaced by 30 names. These 30 names can be then used to build required logic using words which are 30 bits long. Even if the application requires several thousand of conditions expressed as AND-terms, it can be done without any technical or economical objections. In contrast to this, a direct table approach is neither technically nor economically feasible.

This process as described in the present invention has been used to generate a complex test application based on miscellaneous hardware and Digital Equipment Corporation (DEC) computing equipment for controlling a process of manufacturing integrated circuits.

Various changes and modifications in the invention may be made without departing from its scope which is limited only by the following claims and their equivalents.

What is claimed is:

1. A control system for a process or apparatus comprising:
   a. preprocessing means for deriving input names corresponding to input conditions from input signals, b. a logic unit, which incorporates an application logic table and separate, application independent, control code wherein said logic unit executes said control code and in response to said input names, uses said application logic table to produce output names representing at least one control action which controls the process or apparatus, and c. post processing means responsive to said output names for producing said control action wherein said preprocessing means includes a replaceable conversion table.

2. The control system of claim 1 wherein said postprocessing means includes a replaceable conversion table.

3. A control system for a process or apparatus comprising:

a. preprocessing means for deriving input names corresponding to input conditions from input signals, b. a logic unit, which incorporates an application logic table and separate, application independent, control code wherein said logic unit executes said control code and in response to said input names, uses said application logic table to produce output names representing at least one control action which controls the process or apparatus, and c. post processing means responsive to said output names for producing said control action.

4. The control system of claim 3 wherein said logic unit is a finite state machine which includes application independent code.

5. The control system of claim 4 further including means for storing said application logic table.

6. The control system of claim 5 wherein said application logic table expresses logical relationships of input names using only implied boolean AND type operators and implied boolean OR type operators.

7. The control system of claim 5 wherein said application logic table includes at least one control word in the form of a pattern of bits.

8. The control system of claim 5 wherein each input name is represented by at least one bit.

9. The control system of claim 8 wherein plurality of input names are linked into a data structure by an implied boolean AND operator to form a control word data structure in the form of a pattern of bits, and wherein said control word data structure when interpreted by said logic unit running said application independent code is interpreted by said logic unit as if there was a boolean AND operator associated with said control word data structure.

10. The control system of claim 9 including means for matching the pattern of bits in an input word with the pattern of bits in a control word to determine if the pattern of bits in said control word is a subset of the pattern of bits in said input word.

11. The control system of claim 10 wherein groups of control words are linked by the implied boolean OR operator.

12. The control system of claim 3 wherein all of said input names are in affirmative from.

13. The control system of claim 3 further including means for storing an input word.

14. The control system of claim 3 wherein said names create a virtual environment for said logic unit.

15. The control system of claim 3 wherein said application logic table size is reduced using said names connected into a data structure using implied AND and implied OR operators.

16. The control system of claim 3 wherein said logic unit, may perform one or any combination of following types of actions: entry actions, exit actions and input actions.

17. A control system for a process or apparatus comprising:

a. preprocessing means for deriving input names corresponding to input conditions from input signals, b. a logic unit, which incorporates an application logic table and separate, application independent, control code wherein said logic unit executes said control code and in response to said input names, uses said application logic table to produce output names representing a control action which controls the process or apparatus, and c. post processing means responsive to said output names for producing said control action wherein said application logic table includes entries having at least first or second values and wherein only said first valued entries provide control information usable by said logic unit.

18. A control system for a process or apparatus comprising:

a. preprocessing means for deriving input names corresponding to input conditions from input signals, b. a logic unit, which incorporates an application logic table and separate, application independent, control code wherein said logic unit executes said control code wherein a plurality of control words are linked together by the implied Boolean OR operator and in response to said input names, uses said application logic table to produce output names representing a control action which controls the process or apparatus, and post processing means responsive to said output names for producing said control action.

19. A control system specializable for different applications by an application specific table comprising:

a common processor usable in more than one application;

an input pre-processor, coupled to said common processor, and, couplable to a plurality of application specific sensors and other processors;

an output post-processor, coupled to said common processor, and couplable to a plurality of application specific output circuits; and an application specific table with a plurality of entries, coupled to said common processor, wherein each said entry is capable of having at least first or second values and wherein only said first values are used by the common processor in carrying out a control function for a selected application.

20. A control system as in claim 19 wherein said entries each have only first or second values.

21. A control system as in claim 19 wherein at least some of said entries of said application table are organized into words with each said word having a common, predetermined, number of entries and wherein said input preprocessor arranges inputs from the sensors or other processors into input words having said common number of entries with each entry therein having at least first or second values.

22. A control system as in claim 21 wherein said common processor compares said input words from said pre-processor to one or more pre-stored words of said application specific table.

23. A control system as in claim 22 wherein said common processor, responsive to a match between only the first values of an input word and said first values of a selected one of said words from said application table, provides a corresponding output indicium to said output post-processor.

24. A control system for a process or apparatus comprising:

preprocessing means for converting an input signal representing an observed condition into at least one input name wherein selected values of said input signal are each affirmatively represented in a selected form as a respective input name, a control table which includes a plurality of entries with one or more of said entries present in said table in said selected form and with others present in said table in one or more different forms, an application dependent table, separate from said preprocessing means and said control table wherein application dependent information is stored, and a logic unit responsive to said input names, said application dependent table and to only said entries present in said control table which are in said selected form for producing a control action which controls the process or apparatus.

25. The control system of claim 24 wherein said logic unit, in response to at least said input names produces output names representing said control action which controls the process or apparatus, and further including post processing means responsive to said output names for producing said control action.

* * * * *